United States Patent [19]

Leschek

[11] 3,855,847

[45] Dec. 24, 1974

[54] ACOUSTIC EMISSION TRANSDUCER AND MONITORING SYSTEM

[75] Inventor: Walter C. Leschek, Pittsburgh, Pa.

[73] Assignee: Westinghouse Electric Corporation, Pittsburgh, Pa.

[22] Filed: June 20, 1972

[21] Appl. No.: 264,663

[52] U.S. Cl............. 73/71.4, 73/71.5 US, 310/8.3, 310/8.9, 310/9.1
[51] Int. Cl. ............................................. G01h 1/00
[58] Field of Search......... 73/71.4, 71.5 US, 67.5 R, 73/67.8 R, 67.8 S, 67.9, 67; 310/8.3, 8.5, 8.9, 9.1

[56] References Cited
UNITED STATES PATENTS

| 2,946,904 | 7/1960 | Renaut............................ 73/67.8 X |
| 3,239,801 | 3/1966 | McGaughey..................... 73/71.5 U |
| 3,242,723 | 3/1966 | Evans............................... 73/71.5 U |
| 3,325,781 | 6/1967 | Harris.............................. 73/67.7 X |
| 3,376,438 | 4/1968 | Colbert........................... 73/67.8 X |
| 3,378,705 | 4/1968 | Bacon.............................. 73/67.8 X |
| 3,427,481 | 2/1969 | Lenahan et al.................. 73/71.5 U |

OTHER PUBLICATIONS

Carlin, Ultrasonics, 2d Ed. 1960, McGraw–Hill pp. 86–87.

Primary Examiner—Jerry W. Myracle
Assistant Examiner—John P. Beauchamp
Attorney, Agent, or Firm—D. C. Abeles

[57] ABSTRACT

An improved acoustic emission transducer and transmission system for the on-line monitoring of acoustic signals generated by a metal when under mechanical stress. The transducer structure includes a tubular housing having a continuous side wall, a bottom wall and an open top. A piezoceramic element is fastened to the bottom of the housing by means of a conductive high temperature adhesive. A positive electrode is fixed to the piezoceramic element by the adhesive and both the piezoceramic element and the positive electrode are cushioned and insulated from the side wall of the housing by means of an inner tubular housing of high temperature insulating material. The inner housing assembly is sealed to enclose the piezoceramic element, adhesive and electrode - the sealant preventing moisture from penetrating the assembly and shorting the crystal. The upper end of the positive electrode passes through the sealant and is connected to an electrical cable which transmits any signal picked up by the transducer to a remote location. The cable is attached directly to a transformer which is used to couple maximum power from the transducer to an output transmission line. The transformer is selected to match the impedance of the transducer to the transmission line.

32 Claims, 6 Drawing Figures

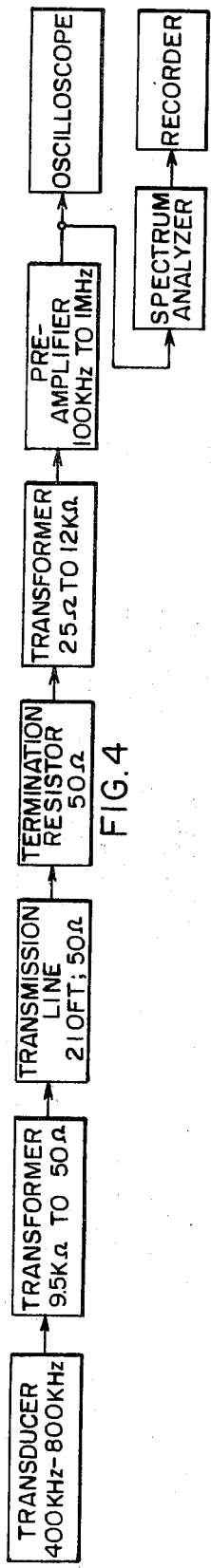
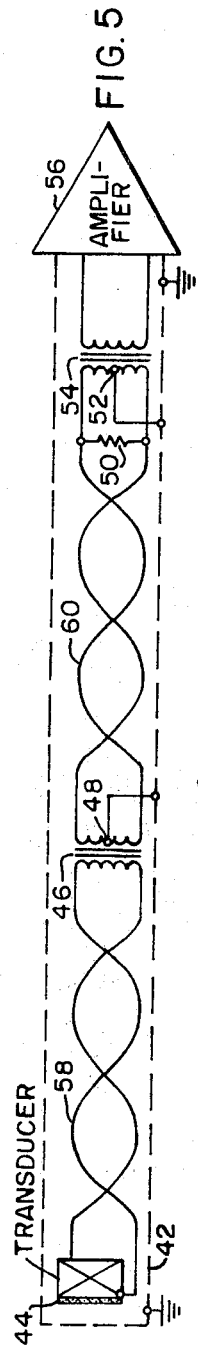
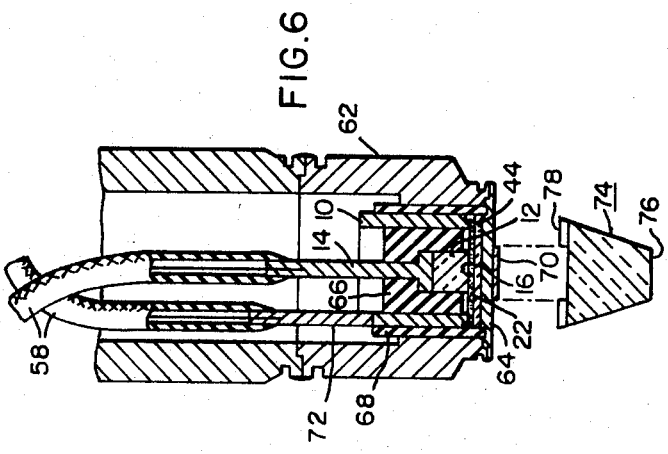

ACOUSTIC EMISSION TRANSDUCER AND MONITORING SYSTEM

BACKGROUND OF THE INVENTION

This invention pertains in general to an acoustic monitoring system for monitoring flaws within a structure under mechanical stress and more particularly to such a system that will monitor the acoustic emission activity and history of a given metal structure during normal operation, in hostile environments, to detect flaws and predict structural failures.

It is generally known that when a metal is mechanically stressed, it generated acoustic signals. The signals are sharp, broadband pulses having a spectrum from audio frequencies up to about 50 MHz. Such signals are easily detected using electroacoustic transducers attached to the surface of the material specimen of interest. Acoustic emission signals are caused by the relative motion, reorientation, growth, and contraction of the individual crystals, grains, and domains that make up the material as well as by flaw initiation, and/or growth.

It has been found that some metals emit large amplitude acoustic signals (magnesium for example) while other metals, such as stainless steel, emit small amplitude signals. These differences can be traced back to the fundamental metallurgical structure of the materials. It has also been found that the nature of the emitted acoustic signals, such as pulse rate and total pulse count, varies with applied stress and with other factors such as fatigue - with each metal having its own distinctive behavior. However, the most important discovery has been that the acoustic emission activity and history of a given metal structure can be used to monitor flaws to predict if and when a catastrophic failure can be expected.

Accordingly, acoustic emission activity and history can be used as a nondestructive testing tool to continuously monitor nuclear reactor pressure vessels to signal a warning when potentially dangerous activity is occurring. Practical implementation of this monitoring technique in nuclear reactor power plants requires that the instrumentation meet a number of severe operating standards. For example, the transducer must be mounted on the reactor pressure vessel where it will experience high temperatures (650°F) and radiation exposures greater than 2R/hr for extended periods of time. Similarly, the associated processing and transmission instrumentation based within the reactor containment will be subjected to the same relatively high temperature and radiation conditions in addition to the humid operating climate normally experienced within the containment. Furthermore, to be effective, an acoustic emission monitoring system must be capable of detecting and locating sources of acoustic emission that are normally masked by a high level of background noise. Thus, the frequencies used for detection must be outside the frequency range of the acoustic background and below the frequency where severe sound attenuation begins to occur in the pressure vessel material. In general, the 400 kHz to 3 MHz frequency band has been found to be most desirable.

A number of acoustic emission transducers and monitoring systems have been constructed and adapted for operation on nuclear reactors. The two most glaring shortcomings of the prior art acoustic emission transducers and monitoring systems have been the poor acoustic coupling of the transducers to test specimen and the need to keep a preamplifier stage within the containment vessel near the transducer. Early preamplifier failure in the high temperature, high radiation, high humidity environment is commonly experienced. The transducers normally last longer than the preamplifiers, but will not operate reliably for any extended period of time.

The problem of poor acoustic coupling is basically caused by the choice of transducer window material and by the bonding adhesives employed. Normally, either a thick dielectric plastic and a thin adhesive bond or a thin grounded metal window and a thick nonconducting adhesive bond are employed. These structural arrangements are used to electrically isolate the electro-acoustic element from the test structure, thereby eliminating ground loop problems. However, the resulting construction has proven to be acoustically inadequate. The large differences in acoustic impedance between the metal test structure, the epoxy or rubber adhesive, the plastic window, and the piezoelectric electroacoustic element cause the acoustic signal to be severely attenuated as it travels through these interfaces towards the electroacoustic element. Poor acoustic coupling shows up as a high elemental mechanical Q- i.e. the element has sharply peaked sensitivity responses at each of its natural mechanical resonance frequencies. If the high impedance piezoelectric crystal were well coupled to the high impedance metal test structure (which looks like a metal medium in the 400 kHz to 3 MHz frequency band), the element resonances would be well damped by the $\rho c$ (specific acoustic impedance of the medium) loading of the medium and a low Q would be measured.

In order to adapt state of the art transducers to on-line acoustic monitoring, a preamplification stage is normally required within the containment vessel to compensate for the relative lack of transducer acoustic sensitivity. This relative insensitivity is caused, in part, by the coupling of a capacitive high impedance transducer directly to a low impedance cable which is in turn normally terminated in a high impedance voltage amplifier. Long lengths of cable employed with this type of arrangement severly attenuates the transducer output voltage, with the attenuation being frequency dependent—the cable appearing as a capacitor. An approach employed to overcome this disadvantage has the high capacitive impedance transducer drive a charge amplifier, which is nothing more than a very low capacitive input impedance amplifier having a voltage gain dependent upon the value of the transducer impedance. While this approach eliminates the degrading affect of the cable upon the systems sensitivity, it has the disadvantages normally associated with a transducer impedance controlled gain (which is temperature and radiation dependent) and a somewhat higher amplifier noise inherency. In most systems used to date, the transducers have not been capable of driving more than approximately 20 feet of cable. Accordingly, preamplifiers have had to be placed within the containment vessel resulting in an early loss of the equipment.

One such transducer system employed by the prior art for testing elastic materials, such as metals for internal flaws is disclosed in Pat. No. 2,803,129 to G. Bradfield, issued Aug. 20, 1957. The transducer illustrated is designed as an off-line test instrument in contrast to the invention to be described, which is designed for on-line monitoring. Those skilled in the art will readily appreciate the distinctions in design operating requirements of the two instruments. The Bradfield transducer utilizes one and the same piezoelectric crystal for transmitting mechanical energy to and receiving it from a test specimen so as to map any internal defects. An associative bridge network is employed to excite the transducer with an oscillator and simultaneously balance the transducer against a network of circuitry designed to simulate the transducers self-impedance. This technique degrades transducer self ring-down noise and renders the device more sensitive to the mechanical energy ultimately detected upon reflection from the test material. The specific detector illustrated is said to enable a much longer and more flexible cable to be employed due to the incorporation of barium titanate asa the piezoceramic material. Of course, the dimensions are relative to the intended application and Bradfield's off-line test instrumentation is not required to transmit signals over distances comparable to the distances encountered in on-line monitoring, i.e., between the reactor pressure vessel and the control room in nuclear applications. The Bradfield transducer system design does not have the capability of providing an output signal of sufficient amplitude, responsive to the acoustic activity generated solely within the test specimen, to be transmitted over the distances contemplated for in an on-line nuclear monitoring application, before amplification is required. The amplitude of the Bradfield transducer output is controlled, to a large degree, by the amplitude of the mechanical energy emitted by the oscillator. An on-line monitoring system must have the capability of monitoring the acoustic signals generated within the test specimen itself, which characteristically are of a much lower amplitude. Furthermore, the Bradfield transducer does not have the rugged compactness and insulation which is required to endure the ambient conditions existing within a reactor environment.

The Pat. No. 3,545,262, entitled Method and Apparatus for Nondestructive Testing of Pressure Vessels, to Richard K. Steele, issued Dec. 8, 1970, is of particular interest in that it discloses a method and apparatus for nondestructively testing pressure vessels to detect the presence and location of flaws within the walls thereof. The method utilizes a plurality of stress-wave sensors, such as accelerometers, which are attached to the external surface of a pressure vessel in spaced relationship with respect to each other so as to be arranged over a substantial portion of the pressure vessel. Pressure fluid is then introduced into the pressure vessel to continuously increase the internal pressure therewithin. If a flaw is present in a wall of the pressure vessel, the extension of the flaw under load by the continually increasing internal pressure propagates a stress wave which is detected by the plurality of stress-wave sensors. The specific mathematical triangulation method described within the patent is particularly suitable for mapping the flaws to be detected by an acoustic monitoring system. However, the patent does not describe, teach, or show an acoustic monitoring transducer or the related transmission system for obtaining such signals.

Thus, an acoustic on-line monitoring system is desired having a highly sensitive acoustic emission transducer which is optimally coupled to the specimen and capable of driving long lengths of cable to a preamplification stage located outside the monitoring environment. Desirably, in nuclear reactor applications, the preamplification stage should be kept within the reactor control room outside the containment vessel. The transducer and connecting cable must be capable of operating within the high temperature, high radiation, high humidity environment which presently exists within the reactor containment.

SUMMARY OF THE INVENTION

Briefly, this invention overcomes the disadvantages of the prior art by providing an improved acoustic emission transducer and transmission system having increased sensitivity and durability over extended operating periods in hostile environments.

The transducer, including piezoceramic element, is hermetically sealed within a rugged, compact, environmentally protected housing which is optimally coupled to a specimen to maximize acoustic transmission. The environmental protection isolates the piezoceramic crystal from localized humidity, radiation and vibrational background and serves to mechanically damp piezoceramic element and spurious housing resonance. The piezoceramic crystal is effectively loaded solely by the metal test specimen due to the thin bond provided between the crystal and metal window of the transducer. The high acoustic impedance of this bond assists in providing a low mechanical Q and enhances the sensitivity of the transducer. The transducer output is electrically connected to a transformer designed to couple maximum power from the transducer to an output transmission line. The transformer is selected to match the impedance of the transducer to the transmission line. The transmission line, terminated at both ends in its characteristic impedance, eliminates standing waves and transfers power from source to load with minimum attenuation, independent of frequency.

BRIEF DESCRIPTION OF THE DRAWINGS

For a better understanding of the invention, reference may be had to the preferred embodiment, exemplary of the invention, shown in the accompanying drawing, in which:

FIG. 4 is a block diagram of an exemplary acoustic emissin monitoring system contemplated by this invention;

FIG. 5 is a schematic diagram of a second embodiment of the acoustic emission monitoring system of this invention; and FIG. 6 is a schematic diagram of a modified embodiment of the acoustic emission transducer of this invention.

DESCRIPTION OF THE PREFERRED EMBODIMENT

The transducer and transmission design, exemplary of this invention, illustrated in FIGS. 1, 2, 3, 5 and 6 and the acoustic emission monitoring system outlined in FIG. 4 uniquely satisfy the requirements for on-line reactor pressure vessel acoustic emission surveillance. Due to the optimized design and materials selection, the transducer of this invention can operate for extended periods of time in the high temperature, high radiation, high humidity environment existing on a reactor pressure vessel. The transducer acoustically couples well to the metal test structure and can directly drive extended lengths of cable ranging to over 400 ft.

Figure 1:
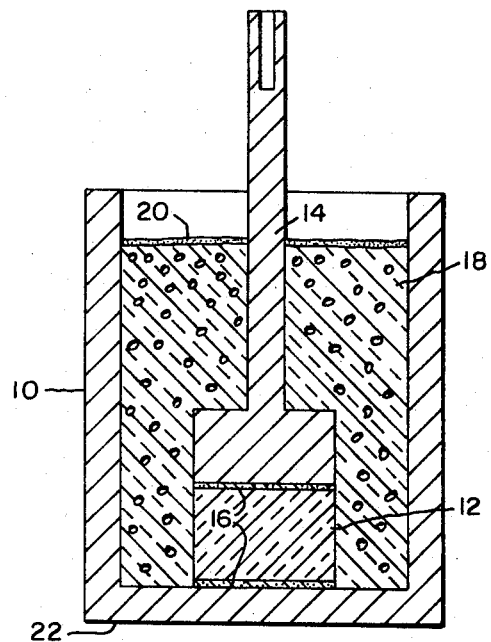
FIG. 1 is a schematic diagram of one embodiment of the acoustic emission transducer of this invention.

The acoustic emission transducer front end illustrated in FIG. 1 as one exemplary embodiment of this invention, basically comprises a tubular housing 10, desirably constructed out of a material such as 304 stainless steel. Any other housing material compatible with the monitoring environment can be employed. In nuclear applications, however, it is desirable to have a housing material having a relatively short radioactive half-life in the order of one month. The relative dimensions of the exemplary housing illustrated includes an outside diameter of 0.250 inch, an inside diameter of 0.194 inch, a height of 0.250 inch and a window thickness (the interface between the piezoelectric element and the specimen under test) of 0.015 inch. It should be appreciated, however, that other dimensions can be employed, and that the dimensions provided are merely given to enable those skilled in the art to form a frame of reference. For best results, however, it is desirable to have the housing and window constructed out of materials having substantially equivalent coefficients of thermal expansion to accommodate high temperature operation.

A piezoceramic element 12 is fastened to the bottom of the tubular housing 10 by means of a conductive high temperature adhesive 16 which will be described hereinafter. G1500 lead-zirconate-titanate piezoceramic material (manfactured by Gulton Industries, Inc., Piezo-Products Div., Fullerton, Calif.) is one substance which can be employed for constructing the piezoelectric element. This material has a Curie temperature of 680°F and can operate continuously at a temperature of 500°F without any severe sensitivity degradation. For higher operating temperatures, lead metaniobate (1,000°F Curie temperature) and bismuth-strontium-titanate (1,100°F Curie temperature) piezoceramic elements can be employed. These higher temperature elements are not as sensitive however. The piezoelectric element is desirably formed in the shape of a disc, with its thickness and diameter chosen so that its thickness and radial resonance frequencies are approximately the same.

A positive electrode 14 is affixed to the piezoelectric element and is desirably constructed out of a material such as oxygen-free high conductivity copper. In most reactor operations it is advantageous to employ oxygen-free high conductivity copper, inasmuch as it holds up well at high temperatures, provides relatively good damping, and does not supply oxygen that might otherwise destroy the plastic adhesives used at elevated temperatures. These characteristics are most suitable for operation in a severe reactor environment. However, where conditions permit, other high conductivity materials can be employed for the positive electrode.

The stainless steel housing 10, piezoelectric element 12 and positive electrode 14 are bonded together utilizing a high temperature electrically conductive adhesive 16. The conductive adhesive is used to insure good electrical contact between external electrodes and the piezoelectric crystal. One such high temperature conductive epoxy adhesive suitable for this purpose is generally known in the art under the name Epo-Tek 418H, manufactured by Epoxy Technology Inc., Watertown, Mass. which is good to 662°F for short periods. However, it has been found that even improved results can be obtained by utilizing a conductive polyimide adhesive formed by mixing three parts of silver to one part of polyimide cement. PLD-700 polyimide cement manufactured by BLH Electronics, Incorporated of Waltham, Mass. can be employed for this purpose and is useful to temperatures of 750°F. The resultant adhesive exhibits a very high bond strength and increased resistance to radiation damage due to the high molecular cross linking of polyimide. Alternatively, a metallic adhesion technique can be employed such as ultrasonically aided thermo-compression bonding, soldering or brazing using induction heating, etc.

Both the piezoceramic element 12 and the positive electrode 14 are insulated from the side wall of the housing 10 by a ceramic potting compound 18. Cerama-Dip 538, manufactured by Aremco Products, Inc., Briar Cliff Manor, N.Y., is one such compound which can be employed for this purpose. Alternatively, the potting compound can be replaced by formed ceramic or a high temperature plastic cup. The ceramic compound further secures the electrode-piezoceramic assembly within the stainless housing, protects the plastic adhesive bond from oxidation damage, and helps to mechanically damp piezoelectric element and spurious housing resonances. Where a ceramic potting compound is employed or other compound having a porous structure, a seal 20, such as silicone, is utilized to seal the pores of the potting surface that would otherwise be exposed. Aremco-Seal 529, manufactured by Aremco Products Incorporated, is one such sealant which can be employed for this purpose and is effective up to temperatures of 600°F. The sealed pores prevent moisture and/or oxygen from penetrating the assembly and shorting out the crystal, or degrading the adhesive bond, thus enhancing the life of the transducer.

Figure 2:
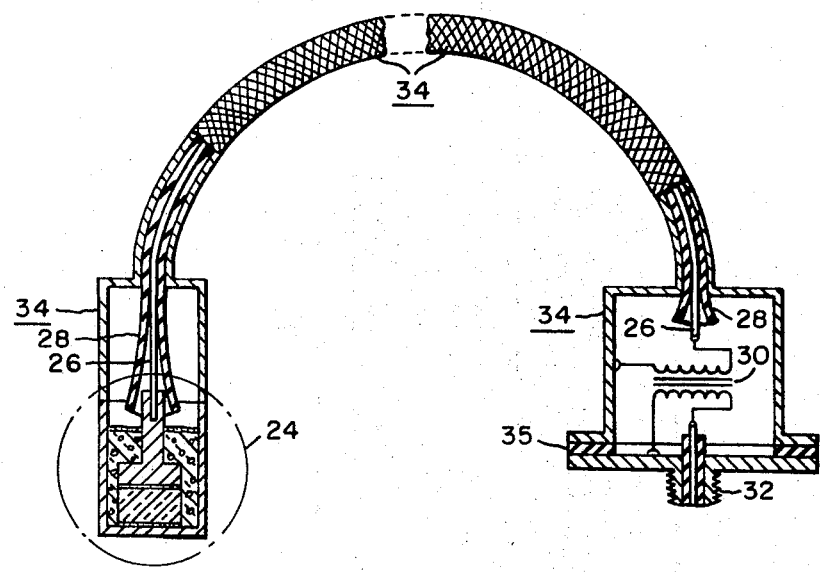
FIG. 2 is a schematic diagram of the acoustic emission transducer of FIG. 1 with accompanying transformer connection.

The complete acoustic emission transducer assembly is illustrated in FIG. 2. The completed structure basically comprises transducer front end 24, tubing, with attached front end connector constructed out of material such as stainless steel, and transformer housing 34, nickel-plated oxygen free copper wire 26, braided fiberglass insulation 28, matching and isolating transformer 30, insulating washer 35, and coaxial connector 32. The stainless steel housing of the transducer front end of this embodiment is tungsten inert gas welded onto the front end connector of the connector-tubing-transformer housing assembly 34, and the oxygen-free high conductivity copper electrode is electrically fastened to the nickel-plated oxygen-free copper wire. It should be understood that the materials described are illustrative and other materials compatible with the intended application in a hostile environment can be employed.

The primary winding of the matching transformer 30 is grounded to the outer case of the transducer assembly and the secondary winding is grounded to the ground of the coaxial connector, with the two grounds insulated from each other by the insulating washer 35. This technique makes it possible for the transducer to make direct electrical contact with the metal test specimen (i.e. the pressure vessel) and still be electrically isolated from the amplifier ground, (which is generally coupled to the coaxial cable 32), thereby avoiding potential ground-loop problems. Thus, it is possible to electrically isolate the pressure vessel ground from the amplifier ground, and at the same time permit the transducer window to make good acoustic contact with the pressure vessel, where ground-loop paths do not present a problem or other accommodations are provided to guard against their effect it may be desirable to connect the grounds as oone means of minimizing electromagnetic interference.

The transformer 30 makes it possible to match the transducer source impedance, approximately 9.5k ohms, to the characteristic impedance of the connecting transmission line, approximately 50 ohms, for maximum power transfer. The transformer's primary inductive reactance is also used to cancel most of the unwanted capacitive reactance associated with the piezoceramic crystal and the short cable interposed between the crystal and transformer.

Figure 3:
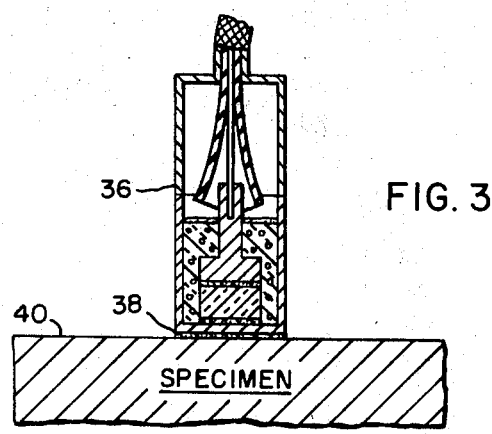
FIG. 3 is a schematic diagram of the acoustic emission transducer assembly of FIG. 1 coupled to the test specimen.

The manner in which the acoustic emission transducer assembly is mounted on the test specimen is illustrated in FIG. 3. The ground isolation illustrated in FIG. 2 makes it possible to place the transducer window directly against the test specimen. In the illustrative embodiment shown in FIG. 3, the transducer assembly is bonded onto the test vessel using only a thin film of high temperature adhesive. Other mechanical fastners and thin bonds can also be employed for this purpose. The thin bonding film exhibits a high shunting acoustic impedance compared to that of the metal window and metal test specimen. Similarly, the thin bond which exists between the piezoceramic element and the metal window exhibits a high shunting impedance compared to that of the piezoceramic element and window. Thus, the piezoceramic element is effectively loaded only by the impedance of the metal test specimen—the bond affects are nonexistent because of their thinness, and consequent high shunting impedance. With only metal $\rho c$ (specific acoustic impedance) loading, the transducer manifests a very low mechanical Q.

FIG. 4 illustrates a block diagram of one exemplary embodiment of an acoustic emission monitoring system contemplated by this invention. The transducer has high sensitivity and a relatively flat response in the 400 kHz to 800 kHz frequency band. The transducer is connected to the transmission line through an isolation and impedance matching transformer whose turns ratio is chosen for maximum power transfer—9.5k ohm transducer source impedance is matched to the 50 ohm transmission line.

Thus, the transmission line is effectively driven from a source impedance equal to its characteristic impedance (50 ohms). Once the maximum power is transferred to the transmissin line, it propagates down the line with practically no attenuation. The other end of the line is terminated into a 50 ohm load resistor. With the transmission line terminated at both ends in its characteristic impedance standing waves are eliminated and power is transferred from source to load with little attenuation, independent of frequency.

The terminated transmission line is coupled into the preamplifier by means of an impedance matching transformer. This transformer transforms the impedance of the line shunted with its terminating resistor into the source impedance (minimum noise impedance) that is needed to give the preamplifier a minimum noise figure (12k ohms for the amplifier illustrated. This transformer also increases the voltage signal that is fed into the preamplifier (maximum power transferred to the transmission line, voltage may be traded for current at the line termination). The transformer also places the amplifier input impedance, reflected through the turns ratio, in shunt with the fifth ohm termination. However, since the amplifier input impedance is very high, the shunt impedance is also very high and does not degrade the 50 ohm termination to any degree.

The preamplifier then amplifies the received acoustic emission signal, after which it is available for spectrum analysis and other signal processing functions, such as counting events per unit time and/or total events.

FIG. 5 illustrates an alternate embodiment of the acoustic emission transmission assembly including the addition of electrostatic shielding 42. An aluminum oxide disk 44 is placed (with good acoustic coupling) between the transducer window and the test specimen to enhance the electrostatic isolation of the system. Aluminum oxide has a very high sound velocity and specific acoustic impedance and therefore does not effect the coupling between the specimen and the transducer. The electrostatic shielding 42 encloses the entire transmission system and is grounded at the test specimen and preamplifier 56 to avoid ground-loop problems and minimize susceptibility to electromagnetic interference. The primary of the transformer 46 is coupled through a pair of twisted electrical leads 58 to the positive electrode and the negative terminal of the transducer housing. The twisted lead connectors serve to minimize susceptibility to electromagnetic interference. The secondary of the transformer 46 is grounded at the center tap 48 to provide a symmetrical output signal, with respect to ground. An electrostatic shield is inserted between the primary and secondary turns to prevent unwanted signal leakage via stray capacitance paths. A second pair of twisted electrical leads 60 extends from the secondary of the transformer 46 to the termination resistor 50 at the primary of transformer 54. The shunting resistor 50 provides a reference impedance to stabilize the impedance reflected through the transformer. Again the center tap of the primary is grounded to provide a symmetrical output signal. The secondary of the transformer 54 is coupled directly to the input of the preamplifier 56 in the same manner described with reference to the previous embodiment. The twisted lead pairs 58 and 60 have been substituted for the coaxial cable transmission line previously described to provide reduced susceptibility to electromagnetic interference. In all other respects the embodiment illustrated in FIG. 5 is identical to the embodiments previously described.

A modified design of the transducer of FIG. 1 is illustrated in FIG. 6. The transducer housing 10, piezoelectric element 12 and positive electrode 14 are identical to the corresponding elements previously illustrated. A high temperature insulating cup 66 has been substituted for the ceramic insulating compound identified by reference character 18 in FIG. 1 as suggested above. The transducer window 22 is tungsten/inert gas welded to the lower end of the housing 10 and a negative electrode 72 is shown brazed onto the housing wall for terminal connection to the twisted lead pair 58. The other conductor of the twisted lead pair 58 is electrically connected to the positive electrode 14. The twisted lead pair is adapted to be connected to the primary of a transformer in a manner similar to that illustrated in FIG. 5. An electrostatic shield collar 62 and acoustic window 64 has been added to enhance environmental protection against electrostatic and electromagnetic interference. The electrostatic shielding is designed in this respect, to extend over the entire assembly as illustrated in FIG. 5. An aluminum oxide disk 44, previously shown in FIG. 5 is interposed between the two windows 22 and 64. A second high temperature plastic cup 68 is positioned between the collar 62 and the housing 10 to aid in damping unwanted spurious housing resonances and to add structural rigidity to the entire unit. The outer acoustic window 64 is fabricated with a raised pedestal 70 in juxtaposition to the piezoelectric element 12. The specific pedestal illustrated has exemplary dimensions of 1/10 inch diameter and a height of 25 mills and is desirably designed to have an effective face area adjacent the acoustic window substantially equal to the face area of the piezoelectric element. The pedestal 70 provides point contact to the specimen to maximize acoustic coupling.

Where high temperature applications are experienced a thermal standoff can be employed to enhance thermal insolation and increase the sensitivity of the transducer. An optimum thermal standoff design is illustrated in FIG. 6 by reference character 74. The standoff can be constructed out of a material such as quartz and is desirably formed in the shape of a trunicated cone. For best results the plane 76 replacing the apex of the cone is sized to have an effective area substantially equal to the face area of the pedestal 70. The base of the cone can either be designed to have a recess to receive the pedestal 70 or raised legs 78 having a height substantially equal to the thickness of the pedestal. The plane 76 is then contacted to the specimen and can be pressure loaded for optimum acoustic coupling. To avoid attenuation the standoff is designed approximately one half wavelength long (at a frequency of 500 KC in this application). The particular conical shape described has structural advantages in assuring point contact to the specimen while providing a large base surface area for structural rigidity at the transducer/standoff interface. Additionally, the legs 78 enhance the thermal isolation provided by the standoff.

Thus, this invention provides a high sensitivity ultrasonic transducer employing materials specifically compatible with a hostile nuclear reactor environment. The transducer is optimally coupled to the reactor pressure vessel to reduce losses in the acoustic input signal. A transformer couples maximum power from the transducer to a transmission line which effectively enhances the received acoustic signal level. A low loss transmission line is employed to transfer this power over very long distances extending from the transducer to a matched load impedance located near the preamplifier input. By terminating the transmission line at both ends in its characteristic impedance, power can be transformed over long distances with little attenuation, independent of frequency. A second transformer is employed to match the impedance of the transmission cable shunted with its termination resistor to the preamplifier, thus providing a minimum noise figure which effectively decreases the system's noise level. Accordingly, the two transformers together effectively increase the signal to noise ratio of the system. Additionally, special care is taken to insure that the preamplifier first stage has as low a noise figure as possible.

In this way, the acoustic emission transducer monitoring system taught by this invention makes it possible to obtain acoustic emission information in a hostile nuclear reactor environment and transport this information over long lengths of cable to processing instrumentation located within the reactor control room without the aid of preamplifiers located near the transducers within the reactor containment vessel. The resulting system makes it possible to provide a reliable on-line, real time acoustic emission monitoring system for reactor components.

Although the transducer and monitoring system of this invention has been described relative to monitoring the acoustic history of an operating nuclear reactor pressure vessel, it will readily be recognized by those skilled in the art that the aforedescribed system can be employed in any application where it is desired to detect acoustic signals in a hostile environment. Other areas of application readily forseeable are: monitoring of welds for cracking and other defects while welds are being made; monitoring cavitation or boiling in liquids; listening for turbine blade fatiguing and bearing wear initiation in large turbines; monitoring specimens during heat treatments; detection of leaks in nuclear reactors; monitoring parts while they are being machined; and all other related applications.

I claim as my invention:

1. An improved acoustic emission transducer system for monitoring acoustic signals generated by a metal specimen when subject to mechanical stress comprising:

a tubular housing having a side wall;
a thin metallic window enclosing one end of said housing to form the bottom wall thereof;
a piezoelectric element acoustically coupled to the interior of said bottom wall of said housing;
a positive electrode electrically coupled to said piezoelectric element;
means for electrically insulating said electrode and said piezoelectric element from the side wall of said housing;
means for sealing said piezoelectric element against moisture so as to prevent moisture from shorting said element, access being provided to said electrode through said sealing means;
means for mechanically damping both piezoelectric element resonances and spurious housing resonances;
an electrically conductive connecting cable having two leads, one grounded at one end to said housing and the other electrically coupled at one end to said positive electrode;
an electrically conductive transmission cable circuit having two leads, one positive and one ground;
a transformer, having primary and secondary windings, designed to match the transducer impedance coupled to said primary winding through said connecting cable to the characteristic impedance of said transmission cable coupled to said secondary winding, one end of said primary and secondary windings, respectively, is grounded at separate electrically isolated points; and
means for insulating said primary winding ground from said secondary winding ground.

2. The acoustic transducer of claim 1 wherein said transmission cable circuit comprises a coaxial cable.

3. The acoustic transducer of claim 1 including
a preamplifier circuit;
a termination transmission line coupled at one end to said preamplifier; and
a second transformer having a primary and secondary winding designed to match the impedance of said transmission cable circuit coupled to said primary winding of said second transformer to the minimum noise impedance of said preamplifier circuit coupled through said termination transmission line to said secondary winding of said second transformer.

4. The acoustic transducer of claim 3 including a termination resistor shunting the primary winding of said second transformer so as to form part of said transmission cable circuit.

5. The acoustic transducer of claim 3 including means for processing and displaying the preamplifier output signal.

6. The acoustic emission transducer of claim 1 including electrostatic shielding around said transducer and transmission means.

7. The acoustic emission transducer of claim 6 wherein an aluminum oxide layer is interposed between said window and the metal specimen.

8. An improved acoustic emission monitoring system for monitoring acoustic signals generated by a metal specimen when subjected to mechanical stress comprising:
an acoustic emission transducer having an electrical output responsive to and representative of acoustic input signals received by said transducer, said electrical output having a characteristic impedance associated therewith;
an electrically conductive cable for transporting said electrical output to a remote location;
a first means for electrically coupling said electrical output to said conducting cable and matching the characteristic impedance of said electrical output to the impedance of said conducting cable at the transducer/cable coupling interface;
means for processing said electrical output at the remote location having an input from said electrically conductive cable; and
a second means for electrically coupling said conductive cable at the remote location to said signal processing input and matching the characteristic impedance of said conducting cable to the minimum noise impedance of said signal processing input at the cable/processor coupling interface in a manner to terminate said conductive cable in its characteristic impedance at both ends.

9. The acoustic emission monitoring system of claim 8 wherein said transducer and said conducting cable are respectively grounded at separate electrically isolated points.

10. The acoustic emission monitoring system of claim 8 wherein said first and second coupling means respectively comprise impedance matching transformers.

11. The acoustic emission monitoring system of claim 10 wherein the corresponding secondary winding of said first coupling means and primary winding of said second coupling means have a grounded center tap so as to provide a symmetrical output signal with respect to ground across the secondary winding of said second coupling means.

12. An improved acoustic emission transducer system for monitoring acoustic signals generated by a metal specimen when subject to mechanical stress comprising:
a tubular housing having a side wall;
a thin metallic window enclosing one end of said housing to form the bottom wall thereof;
a piezoelectric element formed in the shape of a disc having approximately equal thickness and radial resonance frequencies coupled to the interior of said bottom wall of said housing;
a positive electrode electrically coupled to said piezoelectric element;
means for electrically insulating said electrode and said piezoelectric element from the side wall of said housing;
means for sealing said piezoelectric element against moisture so as to prevent moisture from shorting said element, access being provided to said electrode through said sealing means; and
means for mechanically damping both piezoelectric element resonances and spurious housing resonances.

13. The acoustic emission transducer of claim 12 wherein said positive electrode is constructed from oxygen-free high conductivity copper.

14. The acoustic emission transducer of claim 12 wherein said housing and said window are constructed from materials having substantially equivalent coefficients of thermal expansion.

15. The acoustic emission transducer of claim 12 wherein said housing and said window are constructed from a material having a radioactive half-life in the order of 1 month.

16. The acoustic emission transducer of claim 12 wherein said piezoelectric element is fastened to the interior of said bottom wall of said housing by means of a thin electrically conductive high temperature adhesive.

17. The acoustic emission transducer of claim 12 wherein said insulating means and said damping means comprises a ceramic material.

18. The acoustic emission transducer of claim 12 wherein said sealing means comprises a silicone sealant.

19. The acoustic emission transducer of claim 12 wherein said means for insulating said electrode and said piezoelectric element from the side wall of said housing, said means for sealing said piezoelectric element against moisture and said means for mechanically damping said piezoelectric element comprises an inner tubular housing of high temperature insulating material characteristically resistant to moisture which is closely received within said tubular housing, said inner housing having an inner formed channel which closely surrounds said piezoelectric element and said positive electrode around the perimeter thereof excluding the piezoelectric element/window interface.

20. The acoustic emission transducer of claim 19 wherein said high temperature insulating material comprises a high temperature plastic.

21. The acoustic emission transducer of claim 12 including an end cover hermetically sealed to and enclosing the other end of said housing opposite said window, said end cover having an access port to said electrode for terminal connection.

22. An improved acoustic emission transducer for monitoring acoustic signals generated by a metal specimen when subject to mechanical stress comprising:
   a tubular housing having a side wall;
   a thin metallic window enclosing one end of said housing to form the bottom wall thereof;
   a piezoelectric element acoustically coupled to the interior of said bottom wall of said housing wherein said bottom wall is constructed to have an effective area in acoustic contact with the specimen at least equal to and juxtaposed the surface area of said piezoelectric element in contact with said window; and
   a thermal standoff acoustically coupling and separating the effective area of said window and specimen, shaped in the form of a truncated cone having the area of the plane replacing the cone's apex substantially equal to the effective area of said window and acoustically coupled to the specimen, the base of said cone is acoustically coupled to said window so as to provide a thermally insulated acoustic path from the specimen to said piezoelectric element.

23. The acoustic emission transducer of claim 22 wherein the height of said cone is sized to substantially equal one half wavelength of the acoustic signal.

24. The acoustic emission transducer of claim 22 wherein said thermal standoff is constructed from quartz.

25. An improved acoustic emission transducer system for monitoring acoustic signals generated by a metal specimen when subject to mechanical stress and transmitting such signals generated over relatively long distances comprising:
   a tubular housing having a side wall;
   a thin metallic window enclosing one end of said housing to form the bottom wall thereof;
   a piezoelectric element acoustically coupled to the intereior of said bottom wall of said housing;
   a positive electrode electrically coupled to said piezoelectric element;
   means for electrically insulating said electrode and said piezoelectric element from the side wall of said housing;
   an electrically conductive connecting cable having two leads, one grounded at one end to the transducer housing and the other electrically coupled at one end to said positive electrode;
   an electrically conductive transmission cable circuit having two leads; and
   a transformer, having primary and secondary windings, designed to match the transducer impedance coupled to said primary winding through said connecting cable to the characteristic impedance of said transmission cable coupled to said secondary winding and wherein said secondary winding has a grounded center tap.

26. The acoustic emission transducer of claim 25 wherein said connecting cable and said transmission cable have twisted leads.

27. The acoustic emission transducer of claim 25 including:
   a preamplifier circuit;
   a termination transmission line coupled at one end to said preamplifier; and
   a second transformer having a primary and secondary winding designed to match the impedance of said transmission cable circuit coupled to said primary winding of said second transformer to the minimum noise impedance of said preamplifier circuit coupled through said termination transmission line to said secondary winding of said second transformer.

28. The acoustic emission transducer of claim 27 including a termination resistor shunting the primary winding of said second transformer so as to form part of said transmission cable circuit.

29. The acoustic emission transducer of claim 27 including means for processing and displaying the preamplifier output signal.

30. The acoustic emission transducer of claim 27 wherein the primary winding of said second transformer has a grounded center tap.

31. The acoustic emission transducer system of claim 25 including electrostatic shielding around said housing, said connecting cable, said transformer and said transmission cable circuit.

32. The acoustic emission transducer of claim 31 wherein an aluminum oxide layer is interposed between said window and the metal specimen.

* * * * *